G. W. MARSTON.
TRANSMISSION GEARING.
APPLICATION FILED MAY 27, 1911.
1,026,448.
Patented May 14, 1912.
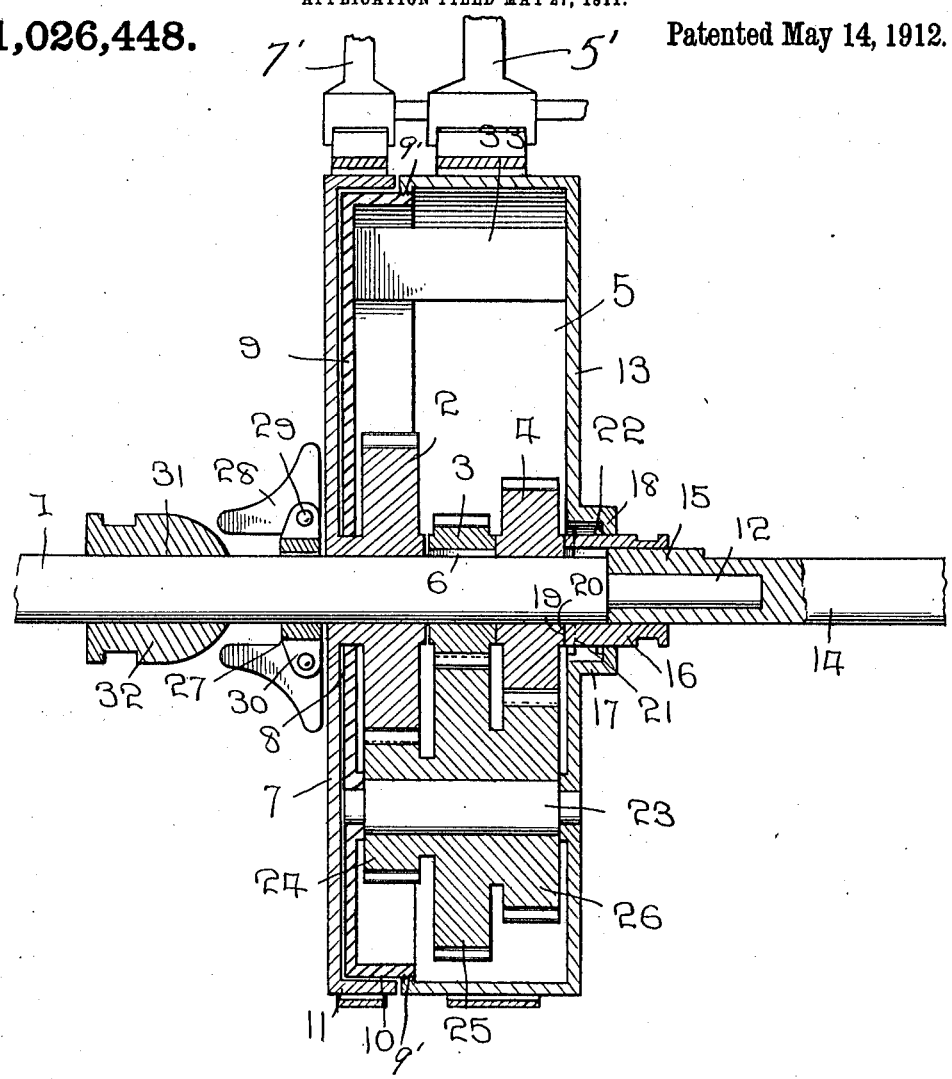
WITNESSES:
INVENTOR
G. W. Marston
BY W. J. FitzGerald
Attorneys

UNITED STATES PATENT OFFICE.

GEORGE W. MARSTON, OF DEXTER, IOWA.

TRANSMISSION-GEARING.

1,026,448. Specification of Letters Patent. Patented May 14, 1912.

Application filed May 27, 1911. Serial No. 629,764.

*To all whom it may concern:*

Be it known that I, GEORGE W. MARSTON, a citizen of the United States, residing at Dexter, in the county of Dallas and State of Iowa, have invented certain new and useful Improvements in Transmission - Gearing; and I do hereby declare the following to be a full, clear, and exact description of the invention, such as will enable others skilled in the art to which it appertains to make and use the same.

This invention relates to transmission gearing and more particularly to that class known as three speed planetary transmission gearing.

An object of the invention is to provide a three speed and reversible transmission gearing transmitting power from a drive shaft to a driven shaft positioned longitudinally of the first shaft, and, Another object is to provide a transmission gearing of this type which will be of comparatively simple construction and positive in operation.

Other objects and advantages will be hereinafter set forth and pointed out in the specification and claims.

The drawing shows a longitudinal sectional view of the device.

Describing the invention in detail, 1 represents the driving shaft from an engine or other source, upon which shaft are mounted the gear wheels 2, 3 and 4 within the large drum 5, which latter surrounds a portion of the shaft 1 and rotates freely around and independently of said shaft. The gear wheel 2 has a diameter two times as great as that of the gear wheel 3, which is just two thirds that of the gear wheel 4. The gear wheel 4 is loosely mounted upon the shaft 1 near the outer end thereof, while the small gear wheel 3 is keyed to the shaft by means of a suitable key 6 inwardly of the gear 4. To the opposite side of the gear 3 is positioned the gear wheel 2, previously mentioned, which is also loose upon the shaft 1 and is integral with the small drum 7 positioned outside of the large or main two part drum 5, the parts of said drum being threaded as at 9' for securing the parts together. The small drum 7 and the gear wheel 2 are connected by the neck portion 8, around which engages the inner head 9 of the large drum 5. The diameter of the drum, from the head 9 for a short distance inwardly, is reduced as shown at 10, to accommodate the flange or right angled portion 11 of the small drum 7. Positioned upon the large drum 5 is a suitable brake 5' and a suitable brake 7' is positioned upon the small drum 7.

The extreme end of the shaft 1 is reduced, as shown at 12, and extends through the outer head 13 of the drum and is engaged and surrounded by the end of the driven shaft 14 carrying the key 15 and the sliding clutch 16, locked with the shaft 14 by the said key 15. The head 13 is bent outwardly near its central portion, as seen at 17, and then at right angles to said outwardly extending portion and parallel with the main portion 13, as indicated at 18. The portion 17 is provided with a central opening to receive the sliding clutch 16, said portion 18 fitting around the clutch. The clutch 16 is provided with the teeth 19 upon its inner end to engage with corresponding teeth 20 upon the adjacent side of the gear wheel 4 when the clutch is at its extreme inward position.

Adjacent the inner end of the clutch 16 is positioned the circular flange 21 having suitable teeth for engagement with the teeth 22 upon the inner side of the portion 18 of the drum 5, when said clutch is in its extreme outward position. The clutch may be engaged and moved longitudinally of the shaft 14 by suitable clutch levers (not shown). Mounted in the opposite heads of the drum 5 are the ends of the shaft 23, which have rigidly mounted thereon the gear wheels 24, 25 and 26 preferably formed *en bloc*. The gear 24 is of the same diameter as the gear 3 and is in engagement at all times with the large gear 2; while the gear 25 is of the same diameter as the gear 2 and is at all times in engagement with the gear 3, and the gear 26 is of the same diameter as the gear 4 and is at all times in engagement therewith.

Keyed to the shaft 1, inwardly of the small drum 7, is the collar 27 having the binding fingers 28 pivoted thereto at their corners by the pins 29, through the ears 30 integral with the collar 27. Slidable longitudinally of the shaft 1 is the finger spreader 32, which is adapted to be moved longitudinally upon the shaft and forced at times between the ends of the binding fingers 28 extending parallel with the shaft, and force said ends outwardly to press the opposite ends of the fingers against the drum 7 and lock the latter in engagement with the drum 5 to rotate said drum 5, and thus transmit rotary motion to the driven shaft 14 by means of the sliding clutch 16, which is in this instance, at its innermost position. Carried in the drum 5 at a point diametrically opposite to the shaft 23 is the balancing weight 33, which counterbalances the shaft 23 and the gear wheels 24, 25 and 26 carried thereby.

For high speed, the spreader 32 is moved, by means of a suitable shifting lever (not shown) connected therewith between the fingers 28 to spread the latter and force them against the small drum 7 which locks drums 7 and 5 together by frictional contact, which necessarily locks all gears causing case and gears to revolve as a unit. The clutch 16 in this instance is moved outwardly to engage the teeth 22 upon the drum 5 thereby locking said drum and shaft together and giving a direct drive. For intermediate speed of two to one drum 5 is held by brake 5' and the gear wheel 3 rigid with the shaft 1 rotates the gear wheel 25, which is twice the diameter of the gear wheel 3; and as the gear wheel 26 is integral with the gear 25, it will rotate once with each revolution of the gear 25 and cause the gear 4, which is of the same diameter as the gear 6, to rotate once to every two revolutions of the gear 3. As the clutch 16, in this instance, is engaged with the gear wheel 4 the driven shaft 14 will be rotated by the gear 4 from the clutch 16, said shaft completing one revolution to every two revolutions of the gear wheel 3 and the shaft 1 with which said shaft is rigid. If gear 2 is held by brake 7' on drum 7, and drum 5 released, the gears 3, 25, 26 and 4 will revolve the same as before described, except gear 24 revolving around gear 2 will carry transmission drum 5 backward, so that it will require three revolutions of gear 3 to produce one of gear 4, producing slow speed three to one. If the sliding clutch 16 be moved outward, engaging drum 5 and brake 7' is applied to drum 7, the drum 5 will revolve backward once to three revolutions of gear 3, producing reverse speed three to one. As the bevel gearing on the axle of the majority of cars is geared three and one-half to one this transmission mechanism would give speeds as follows: high, three and one-half; intermediate, seven; slow, ten and one-half; and reverse, ten and one-half. It will be evident that the speeds may be changed by changing the relative size of gears.

It will thus be seen that I have provided a transmission gearing having three forward speeds and a reverse speed. It will also be seen that this transmission gearing is of extremely simple construction and operation and will be effective in use. It will also be noted that sliding clutch 16 is engaged with gear 4 for all forward speeds; and only moved outward for reverse, which is very seldom, and only when car is stopped. It will also be seen that one of the smallest gears is secured to shaft 1, consequently all other gears must move slower than the shaft, thus reducing wear, noise, and power to operate same, to the minimum.

What I claim is:

1. A transmission gearing comprising a main drum, a small drum engaging with said main drum, a brake for each of said drums, a drive shaft, said drums being mounted on said drive shaft, a driven shaft positioned on the end of said drive shaft, gears carried upon said drive shaft within said drums, one of said gears being integral with said small drum, a shaft carried by said main drum and positioned parallel with the end of said drive shaft within said drum, gears mounted upon said shaft carried by said drum for engagement with said gears on said drive shaft, and a sliding clutch mounted on said driven shaft for connecting said driven shaft with one of the gears on said drive shaft.

2. A transmission gearing comprising a main drum, a small drum engaging with said main drum, a brake for each of said drums, a drive shaft, said drums being mounted on said drive shaft, gears carried upon said drive shaft within said drums, one of said gears being integral with said small drum, a shaft carried by said main drum and positioned parallel with the end of said drive shaft within said drum, gears mounted upon said shaft carried by said drum for engagement with said gears on said drive shaft, and a sliding clutch keyed to said driven shaft for connecting the latter with the main drum.

3. A transmission gearing comprising a main drum, a small drum engaging with said main drum, a brake for each of said drums, a drive shaft, said drums being mounted on said drive shaft, gears carried upon said drive shaft within said drums, one of said gears being integral with said small drum, a shaft carried by said main drum and positioned parallel with the end of said drive shaft within said drum, gears mounted upon said shaft carried by said drum for engagement with said gears on said drive shaft, a sliding clutch keyed to said driven shaft for connecting the latter with the main drum or one of the gears on said drive shaft, and means upon said main shaft adjacent said small drum to press the latter against said main drum to lock said drums to one another for rotation with said main shaft.

In testimony whereof I have signed my name to this specification in the presence of two subscribing witnesses.

GEORGE W. MARSTON.

Witnesses:
W. H. MARSTON,
P. C. MORRIS.

Copies of this patent may be obtained for five cents each, by addressing the "Commissioner of Patents, Washington, D. C."